Dec. 20, 1955   R. T. DE MUTH   2,727,577
PROPELLER MOUNTING
Filed April 16, 1953
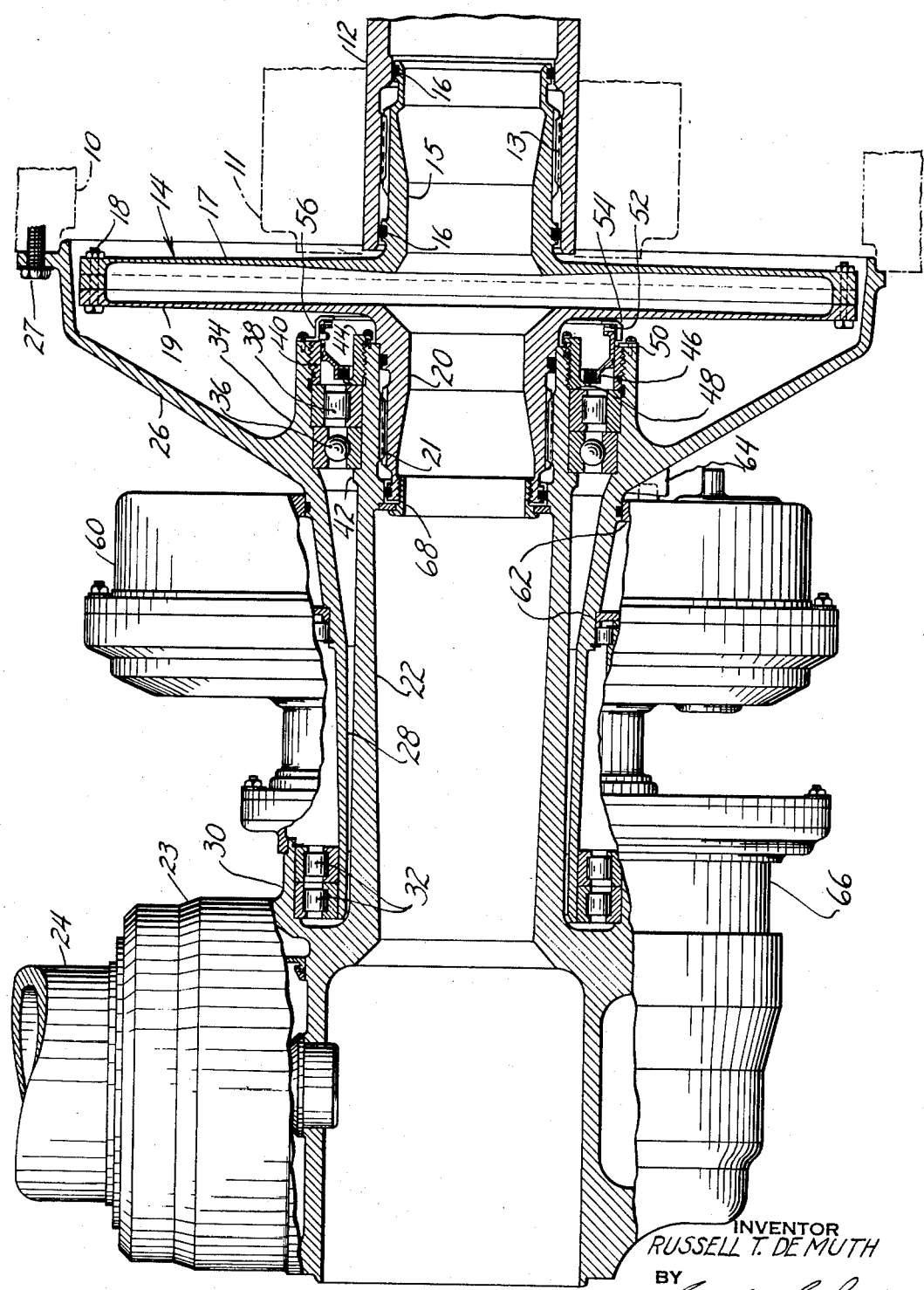
INVENTOR
RUSSELL T. DE MUTH
BY
Godfrey B. Speir
ATTORNEY

UNITED STATES PATENT OFFICE 2,727,577
Patented Dec. 20, 1955

2,727,577

PROPELLER MOUNTING

Russell T. De Muth, Passaic, N. J., assignor to Curtiss-Wright Corporation, a corporation of Delaware Application April 16, 1953, Serial No. 349,147

9 Claims. (Cl. 170—135.7)

This invention relates to an improvement in the mounting of aircraft propellers and is concerned particularly with mounting arrangements which have great resistance to fatigue resulting from vibration induced stresses. The invention lies in the same field as the invention in Cushman application Serial No. 255,789 filed November 10, 1951, and has, in general, the same objectives as said Cushman application.

Briefly, the arrangements of this invention comprise a hollow non-rotating mounting shaft which extends from a power plant or a gear box. The propeller includes an integral driving shaft which sleeves within the non-rotating hollow shaft, spaced bearings being disposed between the propeller driving shaft and the hollow shaft. The inboard end of the propeller driving shaft comprises a flexible coupling, a part of which engages with the driving shaft of the power plant. Either a rotating or non-rotating propeller pitch changing mechanism is disposed inboard of the propeller hub and is piloted on the exterior of the non-rotating shaft.

By the structure of this invention, oscillatory bending moments are avoided or minimized in the propeller mounting, minimizing opportunities for failure in the system due to fatigue resulting from stresses induced by vibration. The integral driving extension of the propeller hub is susceptible to oscillatory bending stress, but the bending moments are minimized by the disposition of one of the supporting bearings for the propeller close to the center of gravity of the propeller.

The invention may be more fully appreciated by considering the attached single figure of drawing in conjunction with the description herebelow.

Phantom structure 10 and 11 represents the mounting end of a power plant, the power plant including an output shaft 12 having internal driving splines 13. This shaft may be mounted in the power plant to deliver driving torque only and need not be mounted to assume thrust or substantial radial loading from the propeller. A flexible coupling indicated in its entirety at 14 has an externally splined hub portion 15, the splines of which are engaged with the splines 13. Suitable seals 16 may be disposed between the elements 12 and 15 to prevent passage of lubricant. The member 15 is integral with a relatively thin disc or diaphragm 17, which, while torsionally rigid, is flexible otherwise, both in an axial direction and for bending. The rim of the disc 17 is secured through driving dogs and bolts 18 to another torsionally rigid but otherwise flexible disc or diaphragm 19. The hub 20 integral with the disc 19 is generally like the hub member 15 and carries external splines for driving engagement with corresponding splines 21 formed on the inside of an inboard propeller shaft extension 22 integral with and extending in an inboard direction from a propeller hub 23. This hub in conventional fashion carries propeller blades one of which is indicated at 24, the blades being mounted for rotation about their own axes for pitch changing movement.

Secured to the engine member 10 is an integral structure comprising a bell housing 26 secured at its rim to the engine structure as by bolts 27, there being an integral hollow shaft 28 extending in an outboard direction from the bell 26. The structure 26, 28 provides a non-rotating shaft relative to which the propeller assembly is journalled for rotation. The hub 23 includes an annular flange 30 which acts as a receptacle for roller bearings 32, outer races of the bearings engaging the flange 30 and inner races of the bearings piloting on the hollow shaft 28 at its outermost end. The bell 26 is provided with an inwardly projected annular flange 34 engaging and holding the outer races of a thrust bearing 36 and of a radial roller bearing 38. The inner races of the bearings 36 and 38 are seated on an inboard portion of the propeller extension 22.

The bearings 32, 36 and 38, rather widely spaced from one another, provide a secure mounting resistant to bending for the propeller assembly comprising the elements 22 and 23, while pure torsional drive for the propeller is afforded by the flexible coupling 14.

In order to secure the propeller from axial movement relative to the non-rotating mounting elements, the outer races of the bearings 36 and 38 are secured within the flange 34 by a locked nut 40. Also, the inner races of the bearings 36 and 38 are secured upon the propeller extension 22 by means of a flange 42 and a locked nut 44 screwed upon the inboard end of the extension 22. Provision is made for sealing the rotating and non-rotating parts by a face seal ring 46 bearing upon a flange 48 formed on the nut 44, the ring 46 being mounted in an annular bracket 50 fitted to and axially slidable relative to the nut 40. The bracket 50 is resiliently urged into sealing engagement by an annularly waved spring 52 backed up by an inwardly turned flange 54 forming part of the lock 56 for the nut 40.

If the propeller and its shaft deflect due to bending moments, there will be angular misalinement between the axis of the propeller and the axis of the power plant driving shaft 12. This misalinement will be assumed by the elastic coupling 14 so that significant bending moments will not be transmitted to the engine shaft 12. Rather, the bending moments are transmitted through the rugged non-rotating shaft 26, 28 to the relatively massive engine structure.

Propellers of the type herein contemplated include a pitch changing mechanism 60 which may conveniently be secured to and piloted on the outside of the non-rotating shaft 28. Suitable mounting points are indicated at 62. Ordinarily, the basic pitch changing mechanism such as 60 is non-rotatively mounted and security against rotation may be provided by a pin connection 64 between the pitch changing mechanism 60 and the bell 26. Pitch changing power from the pitch changing mechanism 60 may be transmitted by various means known in the art to the propeller blades, through the propeller hub, an appropriate housing for such transmission mechanism being shown at 66.

In the assembly and disassembly of a propeller and mounting of the type herein described, removal of the propeller and mounting is afforded by removal of the securing bolts 27 whereupon all of the solid line components shown in the drawing except shaft 12 may be removed bodily with the propeller, the coupling hub element 15 slipping out of the engine shaft 12. Thereafter, breakdown of the various components of the propeller and mounting may be readily accomplished.

It may be noted that the elastic coupling 14 is secured to the hub extension 22 by an appropriate screw connection 68. This connection may be broken either before or after disassembly of the propeller to separate the elastic coupling from the propeller extension. Removal of the elastic coupling gives access to the nuts 40 and 44 by which the hub assembly may be separated from the non-rotating shaft assembly 26, 28.

Though a single embodiment of the invention is shown, it is to be understood that the invention may be applied in other forms and in various environments. Changes may be made in the arrangements shown without departing from the spirit of the invention. Reference should be had to the appended claims for definition of the limits of the invention.

What is claimed is:

1. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and a drive coupling between and connecting said power output shaft and said hub shaft extension.

2. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and an angularly elastic drive coupling beween and connecting said power shaft and said hub shaft extension.

3. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and a drive coupling between and connecting said power output shaft and said hub shaft extension, one of said bearings comprising a thrust bearing.

4. In a mounting for a propeller on an aircraft engine, the latter having a rotating power output shaft and a non-rotating mounting face, a non-rotating member having a bell portion secured to said face and an integral non-rotating hollow shaft, extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing axially spaced from the first bearing, between the inboard ends of said shaft extension and said hollow shaft, an a drive coupling between and connecting said power output shaft and said hub shaft extension, one of said bearings comprising a thrust bearing, and a non-rotating pitch changing mechanism mounted on the outside of said hollow shaft.

5. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and a drive coupling between and connecting said power output shaft and said hub shaft extension, said drive coupling comprising an elastic disc secured to the power shaft, an elastic disc secured to the hub shaft extension, and means securing the peripheries of said discs to one another.

6. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and a drive coupling between and connecting said power output shaft and said hub shaft extension, the engine-end bearing of said two bearings comprising a thrust bearing, said bearing comprising an outer race secured to said hollow shaft against relating axial movement and an inner race secured to said hub shaft extension against relative axial movement.

7. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and a drive coupling between and connecting said power output shaft and said hub shaft extension, the engine-end bearing of said two bearings comprising a thrust bearing, said bearing comprising an outer race secured to said hollow shaft against relative axial movement and an inner race secured to said hub shaft extension against relative axial movement, and means to seal said hollow shaft and said shaft extension at their inboard ends.

8. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and a drive coupling between and connecting said power output shaft and said hub shaft extension, the engine-end bearing of said two bearings comprising a thrust bearing, said bearing comprising an outer race secured to said hollow shaft against relating axial movement and an inner race secured to said hub shaft extension against relative axial movement, and pitch change mechanism mounted on said hollow shaft.

9. In a mounting for a propeller on an aircraft engine, the latter having a rotating power output shaft and a non-rotating mounting face, a non-rotating member having a bell portion secured to said face and an integral non-rotating hollow shaft extending predominantly in an outboard direction from said bell portion and coaxial with said output shaft, a propeller including a hub and an integral shaft extension, said extension extending inwardly within said hollow shaft, the hub proper lying outboard of and beyond the end of said hollow shaft, an antifriction bearing between the inboard end of said propeller hub and said hollow shaft near the outboard end of the latter, an antifriction bearing, axially spaced from the first bearing, between the inboard ends of said shaft extension and said hollow shaft, and a drive coupling between and connecting said power output shaft and said hub shaft extension, the engine-end bearing of said two bearings comprising a thrust bearing, said bearing comprising an outer race secured to said hollow shaft against relating axial movement and an inner race secured to said hub shaft extension against relative axial movement, and pitch change mechanism mounted on said hollow shaft, said drive coupling comprising yieldable elastic discs secured together at their edges and one secured to each of said hub shaft extension and to said power output shaft.

References Cited in the file of this patent

UNITED STATES PATENTS

| | | |
|---|---|---|
| 1,027,252 | Isaacson | May 21, 1912 |
| 1,481,024 | Porter | Jan. 15, 1924 |
| 2,220,514 | D'Aubarede | Nov. 5, 1940 |
| 2,370,135 | Berliner | Feb. 27, 1945 |
| 2,613,749 | Price | Oct. 14, 1952 |
| 2,620,887 | Tiedeman et al. | Dec. 9, 1952 |

FOREIGN PATENTS

| | | |
|---|---|---|
| 290,740 | Italy | Nov. 27, 1931 |
| 574,140 | France | July 5, 1924 |